(12) United States Patent
Chiu et al.

(10) Patent No.: US 7,365,731 B2
(45) Date of Patent: Apr. 29, 2008

(54) DISPLAY CIRCUITRY OF DISPLAY

(75) Inventors: Chung-Ming Chiu, Jungli (TW); Ming-Da Chung, Pingtung (TW)

(73) Assignee: TPO Displays Corp., Chu-Nan (TW)

( * ) Notice: Subject to any disclaimer, the term of this patent is extended or adjusted under 35 U.S.C. 154(b) by 618 days.

(21) Appl. No.: 10/941,695

(22) Filed: Sep. 14, 2004

(65) Prior Publication Data

US 2005/0140642 A1    Jun. 30, 2005

(30) Foreign Application Priority Data

Dec. 15, 2003  (TW) .............................. 92135344 A

(51) Int. Cl.
G09G 3/36 (2006.01)
(52) U.S. Cl. ........................ 345/103; 349/54
(58) Field of Classification Search .................. 345/93, 345/98, 103; 349/54, 143
See application file for complete search history.

(56) References Cited

U.S. PATENT DOCUMENTS

| | | | |
|---|---|---|---|
| 5,191,647 A | 3/1993 | Masaki | |
| 5,426,447 A | 6/1995 | Lee | |
| 5,523,773 A | 6/1996 | Arakawa et al. | |
| 5,714,985 A | 2/1998 | Kawamura et al. | |
| 6,111,621 A * | 8/2000 | Kim et al. | 349/54 |
| 6,337,677 B1 | 1/2002 | Higashi | |
| 6,429,843 B1 * | 8/2002 | Zhang et al. | 345/93 |
| 6,522,317 B1 | 2/2003 | Satou et al. | |
| 6,703,994 B2 | 3/2004 | Edwards | |
| 6,762,754 B2 | 7/2004 | Murade | |
| 2001/0022571 A1 * | 9/2001 | Nakano et al. | 345/98 |
| 2002/0033924 A1 * | 3/2002 | Matoba et al. | 349/143 |

* cited by examiner

Primary Examiner—Amare Mengistu
Assistant Examiner—Yuk Chow
(74) Attorney, Agent, or Firm—Liu & Liu

(57) ABSTRACT

A display circuit of a display is provided to improve image quality of the display. The display circuit comprises a plurality of sections, a plurality of image input lines and a plurality of dummy extended data input lines. Each section comprises a plurality of data input lines for receiving data signals from the image input lines. A dummy extended data input line is formed by extending the data input line, expect for the longest data input line, so that the length of the dummy extended data input line is equal or smaller than that of the longest data input line. Thus, every image input lines will have the same or similar overlap capacities.

17 Claims, 5 Drawing Sheets

DISPLAY CIRCUITRY OF DISPLAY

CROSS-REFERENCE TO RELATED APPLICATION

This application claims the priority benefit of Taiwan application serial no. 92135344, filed on Dec. 15, 2003.

BACKGROUND OF THE INVENTION

1. Field of the Invention

The present invention generally relates to a display circuitry of a display. More particularly, the present invention generally relates to a display circuitry for improving the image quality of the display.

2. Description of the Related Art

Cathode ray tube (CRT) is provided as the display device of a variety of electronic appliances such as computer, terminals and television for displaying images and motion pictures. In the past, because of the cathode ray tube has an excellent image quality, it was widely used display devices. However, the cathode ray tube (CRT) display has the disadvantages of being large size, high radiation, heavy weight and high power consumption.

Accordingly, to resolve the disadvantages described above, the flat panel display (FPD) is developed. In general, the flat panel display (FPD) is classified into liquid crystal display (LCD), field emission display (FED), organic light emitting diode (OLED), and plasma display (PDP). Because of the liquid crystal display (LCD) has the advantages of being small size, thin, lightweight, low operational voltage, low power consumption, radiation free and environmentally friendly, it has gradually replaced the conventional CRT display. In recent years, the liquid crystal display (LCD), for example, the thin film transistor (TFT) liquid crystal display (LCD) has become the main stream of the display devices. Moreover, the liquid crystal display can also be used in a variety of portable electronic device, such as mobile phone, personal digital assistant (PDA) and other wireless communication devices.

FIG. 1 is a block diagram schematically illustrating a conventional liquid crystal display. Referring to FIG. 1, a liquid crystal display 10 including a data line driving circuit 102, a scan line driving circuit 104, data lines 106 and scan lines 108 is disclosed. As shown in FIG. 1, a plurality of pixels are disposed in the intersections of every data line 106 and every scan line 108. Moreover, an application specific integrated circuit (ASIC) 14 is mounted on a print circuit board (PCB) 12 connecting to the data line driving circuit 102 via image input lines 16 for driving the liquid crystal display 10. Therefore, the image quality of the liquid crystal display 10 will be influenced by the layout of the connection between the image input lines 16 with the data lines 106. Thus, as the number of the image input lines 16 increases, the influence would be exponential to the resistance and the capacitance (i.e., a so-called RC constant) of the wiring of the image input lines 16, and therefore the influence would be very significant. For example, the driving capacity and the power consumption of the application specific integrated circuit (ASIC) 14 will be seriously influenced by the RC constant. Also, as the number of the image input lines 16 increases, the difference of the loading between every image input lines 16 will also be very significant, and thus the image displayed by the liquid crystal display (LCD) 10 is not consistent.

FIG. 2 is a block diagram schematically illustrating the wiring of a conventional liquid crystal display. As shown in FIG. 2, the liquid crystal display (LCD) includes n image input lines, n data input lines, m image driver circuits (n and m are positive integers), and a plurality of pixels, wherein the pixels are divided into m sections including a first section 202, a second section, . . . , and a mth section 204. The first section 202 includes a first section of pixels 206, a first image driver circuit 208 and n data input lines 210. Likewise, the mth section 204 includes a mth section of pixels 212, a mth image driver circuit 214 and n data input lines 216. Therefore, the pixels of the liquid crystal display 10 shown in FIG. 1 is divided into m sections including the first section of pixels 206 to the mth section of pixels 212 shown in FIG. 2. In addition, the data line driving circuit 102 shown in FIG. 1 is divided into m sections including the first image driver circuit 208 to the mth image driver circuit 214 shown in FIG. 2.

As shown in FIG. 2, the nth data input line is connected to the first image input line, the (n−1)th data input line is connected to the second image input line, and the first data input line is connected to the nth image input line. The number of line-cross overlap (the number of overlaps between the data input line and the image input line) of the first image input line is 0, that of the second image input line is 1*m, that of the third image input line is 2*m, and accordingly, that of the nth image input line is (n−1)*m. Therefore, the loading and the overlap capacity of every image input lines of a conventional liquid crystal display (LCD) are not the same because of the different numbers of line-cross overlap of every image input lines. Thus, the application specific integrated circuit (ASIC) is required to provide a variety of driving capacities to drive every image input lines. Furthermore, for two neighboring sections such as a previous section and a following section shown in FIG. 2, the nth data input line of the previous section is connected to the first image input line, and the first data input line of the following section is connected to the nth image input line. Since the difference of the number of the line-cross overlap between the nth data input line of the previous section and the first data input line of the following section is substantially large, a disparity of the rendered image will be generated between any two neighboring sections, and therefore the image quality of the display is reduced.

SUMMARY OF THE INVENTION

The present invention overcomes the deficiencies in image quality in prior art systems by matching the RC characteristics of neighboring data input lines, to reduce the effect of RC in the data input lines on disparity in image quality.

In one aspect of the present invention, connections of data input lines are made to image input lines at every two or more image input lines, skipping every one or more image input line. In one embodiment, for each pixel section, the connections are made for every two image input lines, starting from the closest image input line, and skipping every one image input line, until the connections reached the furthest image input line, data input line connections are made starting from the farthest image input line that has not been connected, to the nearest image input line that has not been connected. As a result, the last connection of one pixel section and the first connection of the immediately adjacent pixel section would have close RC characteristics of the data input lines, because the connections are located along the respective data input lines by a difference of no more than the distance between two adjacent image input lines. According to this aspect of the present invention, the adjacent pixel section will have significantly reduced disparity in image qualities arising from mismatch of RC characteristic of the data input lines.

In another aspect of the present invention, the RC characteristic of adjacent data input lines can be matched by providing dummy conductor lines to the data input lines. The dummy conductor lines may be of different physical characteristics (e.g., length, width and/or thickness, or material) for different data input lines to match the RC characteristic of the data input lines. In one embodiment, the length of the dummy conductor line for each data input line is chosen to extend the data input lines to be at least as long the longest data input line. In another embodiment, the length of the dummy conductor line for each data input line is chosen to extend the data input lines to different lengths in order to match the RC characteristics in the data input lines. It is within the scope and spirit of the present invention that other physical characteristic of the dummy conductor lines may be adopted in the alternative or in addition to the length (e.g. the width, thickness and/or material) of the dummy conductor line can also be controlled to effect matching the RC characteristics of the data input lines.

In another aspect of the present invention, the RC characteristics of the data input lines are matched using a combination of the skipped connections and dummy conductor lines aspects above.

Therefore, according to one embodiment of the present invention, a display circuit of a display in which every image input lines of the application specific integrated circuit (ASIC) of the display will have the same or similar driving capacities and two neighboring sections of the display will have the same or similar numbers of line-cross overlap so that the image quality is improved compared to the conventional display described above.

In accordance with the above embodiment, a display circuit of a display is provided. The display circuit comprises a section, a plurality of image input lines and at least a dummy extended data input line. The section comprises a plurality of data input lines for receiving data signal into the section. Each image input line is connected to a corresponding data input line forming a connecting node respectively. An extended portion of the data input line forms a dummy extended data input line, wherein a length of the dummy extended data input line is equal or smaller than that of the longest data input line so that the total length of each data input line and its dummy extended data input line is equal or substantially equal. Therefore, every image input lines will have the same or similar overlap capacities.

In one aspect of the present invention, the dummy extended data input line provides an approach to reducing the difference of the number of the line-cross overlap between the nth data input line of the previous section and the first data input line of the following section.

In another aspect of the present invention, the dummy extended data input line may equalize the RC loading of every image input line.

In still another aspect of the present invention, the dummy extended data line plays a role of eliminating the image difference of neighboring section to improve the image quality of the display.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
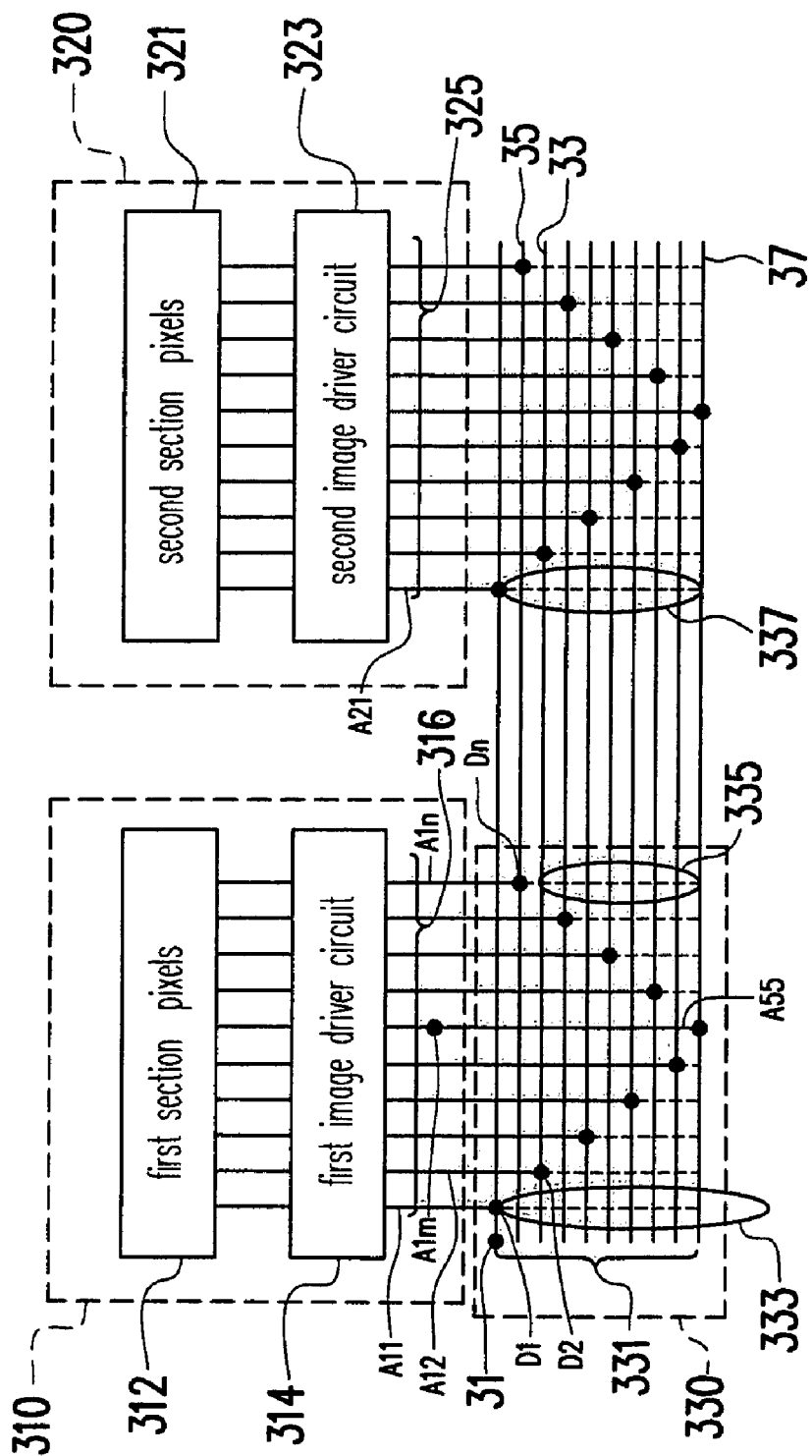
FIG. 3 is a block diagram schematically illustrating the wiring of a display according to the present invention.

FIG. 3 is a block diagram schematically illustrating the wiring of a display comprising, for example but not limited to, FPD such as LCD, FED, OLED, FDPor other type of displays according to an embodiment of the present invention. Referring to FIG. 3, a display comprises, for example but not limited to, a plurality of sections in the display including a first section 310, a second section 320 and so on, and a plurality of image input lines 331. The display comprises, for example but not limited to, single-crystal amorphous silicon TFT, or low temperature polysilicon (LTPS) TFT switches and/or drivers. In the display, each of the sections, such as the first section has a plurality of data input lines 316, connecting to a corresponding image input line 331 respectively. It is noted that, in the embodiment, the number of data input lines is equal to the number of image input lines of each section. As the first section 310 shown in FIG. 3, the first data input line A11 is connected to the first image input line 31 with a connecting node D1, and the second data input line A12 is connected to the third image input line 33 with a connecting node D2. Finally, the last data input line A1n is connected to the second image input line 35 with a connecting node Dn. Accordingly, other data input lines are connected with the corresponding image input lines in the same skipping manner (i.e., every other image input line) as shown in FIG. 3, with the exception in the region 340 shown in FIG. 4. It is noted that, the connections of the wiring between the data input lines and the image input lines of the embodiment is only provided as an exemplary embodiment and should not be used to limit the scope of the invention, those skilled in the art will easily understand that a variety of changes according to various requirements can be made falling within the spirit and scope of the present invention.

Figure 1:
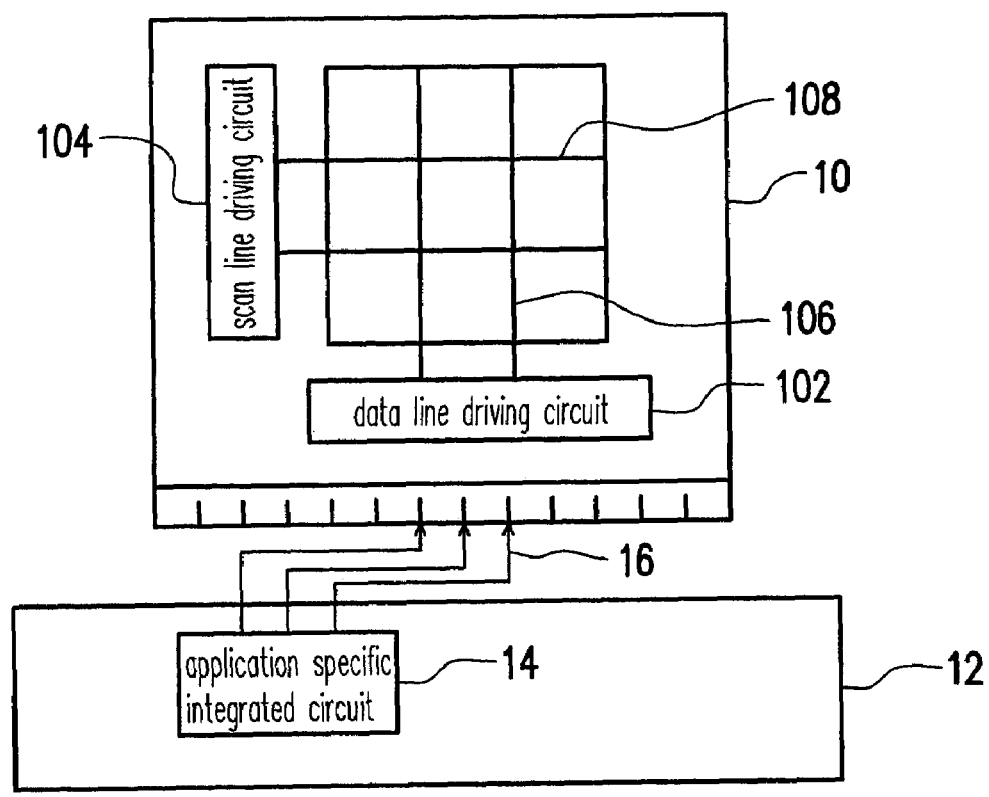
FIG. 1 is a block diagram schematically illustrating a conventional liquid crystal display.
Figure 2:
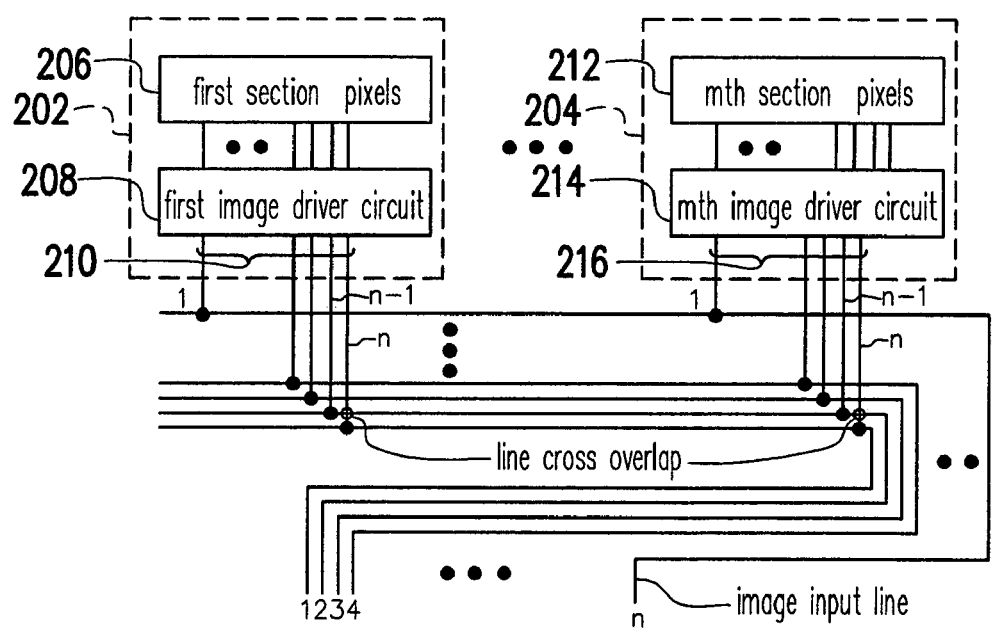
FIG. 2 is a block diagram schematically illustrating the wiring of a conventional liquid crystal display.

Thereafter, the image input lines 331 of FIG. 3 can be connected to, for example but not limited to, an application specific integrated circuit (ASIC), which may be similar to the conventional ASIC 14 as shown in FIG. 1. The application specific integrated circuit (ASIC) 14 can provide a data signal via the image input lines to drive each section of pixels, and thus a plurality of frames of image can be displayed on the display by each section of pixels. Each section comprises a section of pixels and a image driver circuit. For example, the first section 310 shown in FIG. 3 comprises a first section of pixels 312 and a first image driver circuit 314, wherein the first section of pixels 312 are connected to the first image driver circuit 314. The first image driver circuit 314 comprises a plurality of data input lines 316, i.e., the data input line 316 of the first section 310 described above. As a data signal is provided into the image input lines 331, the image driver circuit 314 can receive the data signal from the data input line 316 via the image input line 316. Thereafter, an image is displayed by the first section of pixels 312 according to the data signal.

Figure 4:
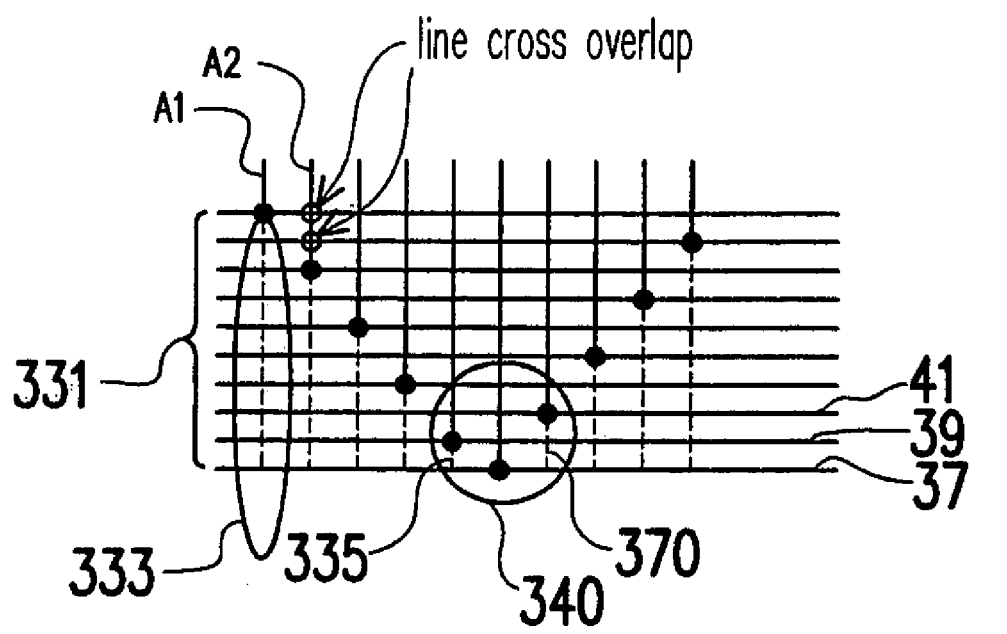
FIG. 4 is an enlarged view schematically illustrating the wiring of the data input line and the image input line.

FIG. 4 is an enlarged view schematically illustrating the wiring of the data input line and the image input line. Referring to FIG. 4, except for the mth data input line A1m, an extended portion is connected with all the data input lines A11 to A1n to form a dummy extended data input line 333. In other words, the length of dummy extended data input line is equal or smaller than that of the longest data input line so that every image lines are being cross-overlapped by substantially same number of extended data input lines. As shown in FIG. 4, the overlap capacity in the region 340 due to the cross-overlap between the dummy extended data input lines and the image input lines (i.e., a so-called line-cross overlap) are rendered uniform by providing dummy extended data input lines 335 and 370. It is to be noted that the dummy extended data input line is not electrically connected with any other image input lines. For example, as shown in FIG. 3, the first data input line A11 of the first section 310 is connected to the first image input line 31 and does not cross overlap with any other image input lines, and thus there is no overlap capacity between the first image input line and the first data input line. However, the second data input line A12 is connected to the third image input line 33 cross overlapping with the first image input line 31 and a second image input line 35, thus there are two overlap capacities between the third image input line 33 and the second data input line A2. Likewise, the mth data input line A1m is connected to the nth image input line 37 cross overlapping with n−1 image input lines, thus there are n−1 overlap capacities between the nth image input line 37 and the mth data input line A1.

Referring to FIG. 3, in the display circuit of the present invention, a dummy extended data input line 333, is connected to the data input line A11 at the node D1 to form an extended data input line such that the total length of the data input line A11 and the dummy extended data input line 333 is equal to the longest data input line A55. It is to be noted that the dummy extended data input line 333 is not electrically connected with any other except electrically connecting with the first image input line 31. Likewise dummy extended data input lines are connected with every data input lines except the longest data input line A55 in a manner described above to form the extended data input lines in order to render the overlap capacities of every image input lines substantially uniform. It is to be further noted that the number and the length of the dummy extended data input lines can be tailored in a manner to improve the image quality. As the dummy data input lines are provided in a manner that every image input lines 331 will have similar overlap capacities, and therefore the application specific integrated circuit (ASIC) can have similar loading and driving capacities for each of the image input lines 331.

It is noted that, the embodiment of the present invention shown in FIG. 3 is only an exemplary embodiment of the display circuit of the present invention. However, the scope of the present invention is not limited to the embodiments. The method of arrangement the dummy data input lines can be achieved through a variety of connection techniques to achieve the purpose of the present invention.

Referring to FIG. 3, the second section 320 also comprises a second section of pixels 321 and a second image driver circuit 323, wherein each of the data input lines 325 is similarly connected to a corresponding image input lines 331. Except for the longest data input line, each of the data input lines 325 extends to form dummy extended data input lines. Therefore, every image input lines 331 will have similar overlap capacities.

It is noted that, in the embodiments of the present invention, the method of disposing the dummy extended data input line is only an exemplary embodiment of the display circuit of the present invention and can not be used to limit the scope of the present invention. Accordingly, the present invention provides dummy extended data input lines connected to the data input lines in a manner to balance the loading and overlap capacity of each image input line, thus the quality of the display image can be effectively improved.

As can be appreciated from the foregoing disclosure of the present invention, the present invention overcomes the deficiencies in image quality in prior art systems by matching the RC characteristics of neighboring data input lines, to reduce the effect of RC in the data input lines on disparity in image quality.

In one aspect of the present invention, connections of data input line are made to image input lines at every two or more image input lines, skipping every one or more image input line. In one embodiment, for each pixel section, the connections are made for every two image input lines, starting from the closest image input line, and skipping every one image input line, until the connections reached the furthest image input line, data input line connections are made starting from the farthest image input line that has not been connected, to the nearest image input line that has not been connected. As a result, the last connection of one pixel section and the first connection of the immediately adjacent pixel section would have close RC characteristics of the data input lines, because the connections are located along the respective data input lines by a difference of no more than the distance between two adjacent image input lines.

According to this aspect of the present invention, the adjacent pixel section will have significantly reduced disparity in image qualities arising from mismatch of RC characteristic of the data input lines.

In another aspect of the present invention, the RC characteristic of adjacent data input lines can be matched by providing dummy conductor lines to the data input lines. The dummy conductor lines may be of different physical characteristics (e.g., length, width and/or thickness, or material) for different data input lines to match the RC characteristic of the data input lines. In one embodiment, the length of the dummy conductor line for each data input line is chosen to extend the data input lines to be at least as long the longest data input line. In another embodiment, the length of the dummy conductor line for each data input line is chosen to extend the data input lines to different lengths in order to match the RC characteristics in the data input lines. It is within the scope and spirit of the present invention that other physical characteristic of the dummy conductor lines may be adopted in the alternative or in addition to the length (e.g. the width, thickness and/or material) of the dummy conductor line can also be controlled to effect matching the RC characteristics of the data input lines.

While the embodiment of the present invention illustrated in FIG. 3 and FIG. 4 matches the RC characteristics of adjacent data input lines using a combination of the skipping connections and dummy extended conductor lines, it is well contemplated that the present invention can improve image quality over the prior art even by using only one of the skipping/alternating connection aspect and the dummy extended conductor lines aspect disclosed in FIG. 3 and FIG. 4.

It should be noted that, in another embodiment of the present invention, other physical characteristic of the dummy conductor lines may be adopted in the alternative or in addition to the length (e.g. the width, thickness and/or material) of the dummy conductor line can also be controlled to effect matching the RC characteristics of the data input lines.

Figure 5:
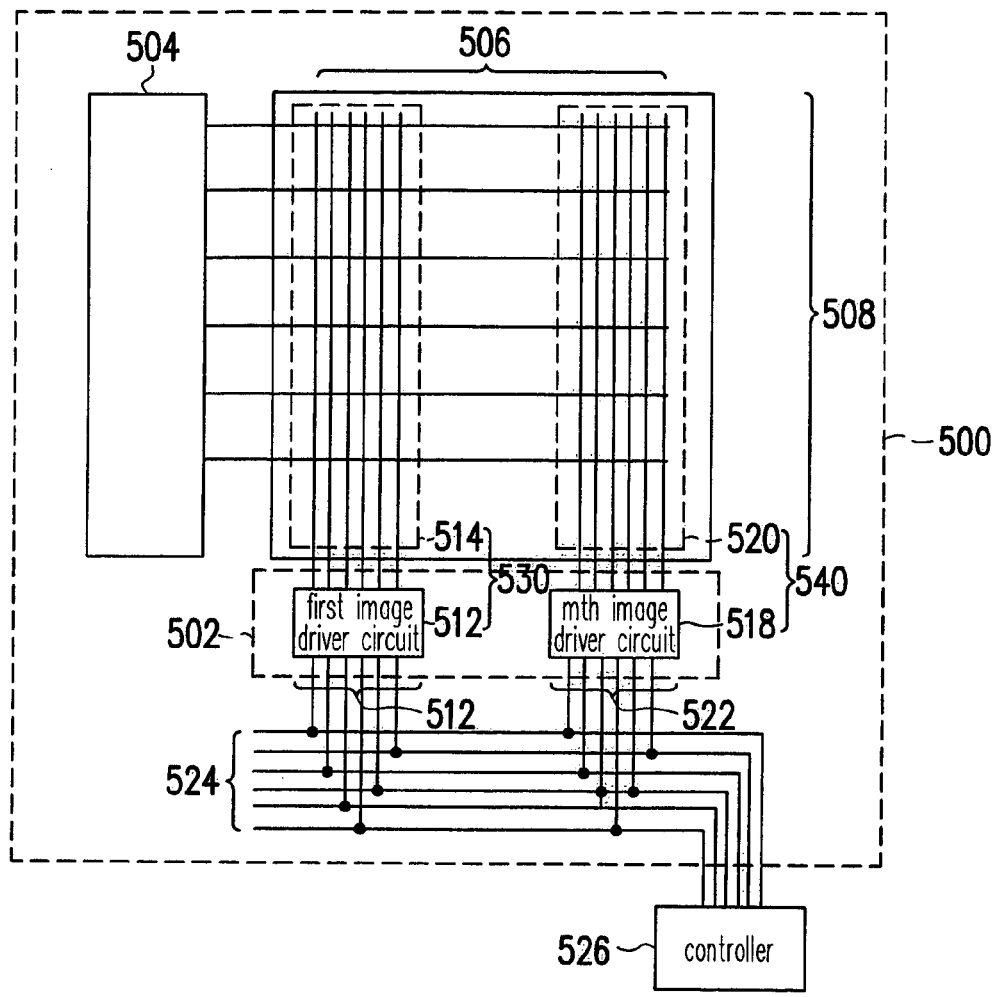
FIG. 5 is a block diagram schematically illustrating a display device according to one embodiment of the present invention.

FIG. 5 is a block diagram schematically illustrating a display device according to one embodiment of the present invention. In one embodiment of the present invention, an electronic device may comprise the display device 500 illustrated in FIG. 5. Referring to FIG. 5, the display device 500 including a data line driving circuit 502 comprising a plurality of image driver circuits 512 connecting to data lines 506, a scan line driving circuit 504 connecting to a plurality of scan lines 508, a plurality of pixels disposed in the intersections of every data line 506 and every scan line 508, a plurality of data input lines 516 to 522, and a plurality of image input lines 524. In one embodiment of the present invention, a controller for controlling the image data such as application specific integrated circuit (ASIC) 526 may be connected to the image input lines 524 carrying input image data to be delivered to the image driver circuits 512 to 518. The data line driving circuit 502 may be divided into m sections comprising, for example but not limited to, the first image driver circuit 512 to the mth image driver circuit 518. In addition, the pixels are divided into m sections comprising, for example but not limited to, the first section of pixels 514 to the mth section of pixels 520. Therefore, the first section 530 comprises, for example, the first image driver circuit 512 and the first section pixels 514, and the mth section 540 comprises, for example, the mth image driver circuit 518 and the mth section pixels 520. It should be noted that, the connection between the image input lines 524 and the data input lines of every image driver circuit (e.g., the data input lines 516 of the first image driver circuit 512) may be performed, for example but not limited to, by the connection method of the embodiments described above. In one embodiment of the present invention, the electronic device comprises, for example but not limited to, cell phone, notebook computer, PDA, and etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image data circuit for a display device having at least a first display section and an adjacent second display section, comprising:

a plurality of image input lines carrying input image data to be delivered to the first and second display sections;

a plurality of data input lines extending from each display section, including a last data input line extending from the first display section and a first data input line extending from the second display section, wherein the last data input line is adjacent to the first data input line, wherein each data input line is electrically connected to an image input line at a node defined at a different location along each data input line from the corresponding display section, wherein one or more of the data input lines each comprises a dummy conductor line extending from the node and overlapping one or more of the image input lines away from the node, and wherein the node of the last data input line and the node of the first data input line are located along the respective data input lines by a difference of no more than distance between two adjacent image input lines.

2. The image data circuit as in claim 1, wherein each data input line has an RC characteristic, wherein the RC characteristics of two or more data input lines are closely matched by providing a desired length of dummy conductor line to each of said two or more data input lines, to avoid significant deviation in image quality at a transition between said two or more data input lines.

3. The image data circuit as in claim 2, wherein the length of all the data input lines, including any dummy conductor lines, in each section are substantially similar.

4. The image data circuit as in claim 1, wherein each data input line has an RC characteristic, wherein the RC characteristics of the last data input line and the first data input line are closely matched to avoid significant deviation in image quality at a transition from the first display section to the second display section.

5. The image data circuit as in claim 1, wherein the nodes of two adjacent data input lines in each of the display sections define connections of said adjacent data input lines to alternate image input lines.

6. The image data circuit as in claim 1, wherein a number of the data input lines are equal to a number of the image input lines.

7. The image data circuit as in claim 1, further comprising an image driver circuit in each of the first and second display sections, from which the data input lines extend.

8. The image data circuit as in claim 7, wherein the image driver circuit is connecting between data lines and data input lines.

9. The image data circuit as in claim 1, wherein the nodes of two adjacent data input lines define connections of said adjacent data input lines to alternate image input lines.

10. A display device, comprising:

a plurality of display sections, each comprising a plurality of pixel circuits operatively coupled to a image driver circuit, the plurality of display sections including at least a first display section and an adjacent second display section;

a plurality of image input lines carrying input image data to be delivered to the plurality of display sections;

a plurality of data input lines extending from each display section, including a last data input line extending from the first display section and a first data input line extending from the second display section, wherein the last data input line is adjacent to the first data input line, wherein each data input line is electrically connected to an image input line at a node defined at a different location along each data input line from the corresponding display section, wherein the node of the last data input line and the node of the first data input line are located along the respective data input lines by a difference of no more that distance between two adjacent image input lines, and wherein one or more of the data input lines each comprises a dummy conductor line extending from the node and overlapping one or more of the image input lines away from the node.

11. An electronic device, comprising:
a display device as in claim 10; and
a controller, providing input image data to the display device to render an image in accordance with the input image data.

12. The image data circuit as in claim 10, wherein the nodes of two adjacent data input lines define connections of said adjacent data input lines to alternate image input lines.

13. An image data circuit for a display section in a display, comprising:
a plurality of image input lines carrying input image data to be delivered to the display section;
a plurality of data input lines extending from the display section;
wherein each data input line is electrically connected to an image input line at a node defined at a different location along each data input line from the corresponding display section, wherein the nodes of two adjacent data input lines define connections of said adjacent data input lines to alternate image input lines, wherein one or more of the data input lines each comprises a dummy conductor line extending from the node and overlapping one or more of the image input lines away from the node, and wherein the nodes of the two adjacent data input lines are located along the respective data input lines by a difference of no more than distance between the alternate image input lines.

14. An image data circuit for a display section in a display, comprising:
a plurality of image input lines carrying input image data to be delivered to the display section;
a plurality of data input lines extending from the display section, including a first data input line and a last data input line;
wherein each data input line is electrically connected to an image input line at a node defined at a different location along each data input line from the display section, and one or more of the data input lines each comprises a dummy conductor line extending from the node and overlapping one or more of the image input lines away from the node, and wherein the node of the first data input line and the node of the last data input line are located along the respective data input lines by a difference of no more than distance between two adjacent image input lines.

15. The image data circuit as in claim 14, wherein each data input line has an RC characteristic, wherein the RC characteristics of two or more data input lines are closely matched by providing a desired length of dummy conductor line to each of said two or more data input lines, to avoid significant deviation in image quality at a transition between said two or more data input lines.

16. The image data circuit as in claim 14, wherein the length of all the data input lines, including any dummy conductor lines, in each section are substantially similar.

17. The image data circuit as in claim 14, wherein the nodes of two adjacent data input lines define connections of said adjacent data input lines to alternate image input lines.

* * * * *